US010346714B2

(12) United States Patent
Dingeldey

(10) Patent No.: US 10,346,714 B2
(45) Date of Patent: Jul. 9, 2019

(54) VISUALLY HIGHLIGHTING SPATIAL STRUCTURES

(71) Applicant: Felix Dingeldey, Erlangen (DE)

(72) Inventor: Felix Dingeldey, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 91 days.

(21) Appl. No.: 14/932,583

(22) Filed: Nov. 4, 2015

(65) Prior Publication Data
US 2016/0125264 A1 May 5, 2016

(30) Foreign Application Priority Data
Nov. 4, 2014 (EP) .................................. 14191641

(51) Int. Cl.
| G06K 9/00 | (2006.01) |
| G06K 9/52 | (2006.01) |
| G06T 11/60 | (2006.01) |
| G06T 11/00 | (2006.01) |
| G06K 9/46 | (2006.01) |

(Continued)

(52) U.S. Cl.
CPC ............ G06K 9/52 (2013.01); G06F 3/0482 (2013.01); G06F 3/04842 (2013.01); G06F 3/04845 (2013.01); G06F 3/04847 (2013.01); G06K 9/4652 (2013.01); G06T 7/0012 (2013.01); G06T 7/90 (2017.01); G06T 11/001 (2013.01); G06T 11/60 (2013.01); G06T 15/08 (2013.01); G06T 2200/24 (2013.01)

(58) Field of Classification Search
CPC ........... G06T 15/08; G06T 2207/30004; G06T 7/0012; G06T 19/00; G06T 11/003; G06T 2200/24; G06T 2210/41; G06T 5/002; G06K 2209/05; G01T 1/161
See application file for complete search history.

(56) References Cited

U.S. PATENT DOCUMENTS 6,373,483 B1 * 4/2002 Becker .................. G06T 11/206
                                                          345/419
2004/0257375 A1 * 12/2004 Cowperthwaite ....... G06T 15/40
                                                          345/582

(Continued)

FOREIGN PATENT DOCUMENTS

WO    WO2006048802 A2    5/2006

OTHER PUBLICATIONS

He et al., Generation of Transfer Functions with Stochastic Search Techniques, Proceedings of the 7th Visualization Conference, 1996, pp. 227-236, AAPA.*
Kniss et al., "Multidimensional Transfer Functions for Interactive Volume Rendering", 2002, IEEE Transactions on Visualization and Computer Graphics, vol. 8, No. 3.*

(Continued)

Primary Examiner — Vu Le
Assistant Examiner — Guillermo M Rivera-Martinez
(74) Attorney, Agent, or Firm — Lempia Summerfield Katz LLC

(57) ABSTRACT

A method for improving visual highlighting of spatial structures in a volume data record includes providing a first transfer function for mapping data values of the volume data record to color values of a visual representation, and providing a selection option for a user to select a parameter set. A second transfer function is generated based on the first transfer function and the selected parameter set. The volume data record is represented by the second transfer function.

12 Claims, 7 Drawing Sheets

(51) Int. Cl.
*G06T 7/00* (2017.01)
*G06F 3/0484* (2013.01)
*G06F 3/0482* (2013.01)
*G06T 15/08* (2011.01)
*G06T 7/90* (2017.01)

(56) References Cited

U.S. PATENT DOCUMENTS

| | | | | |
|---|---|---|---|---|
| 2007/0229500 A1* | 10/2007 | Engel | G06T 15/08 | 345/422 |
| 2008/0080775 A1* | 4/2008 | Zabih | G01R 33/5611 | 382/226 |
| 2009/0141018 A1* | 6/2009 | Lobregt | G06T 15/08 | 345/419 |
| 2010/0317420 A1* | 12/2010 | Hoffberg | G06Q 30/0207 | 463/1 |
| 2012/0038649 A1* | 2/2012 | Kanitsar | G06T 11/003 | 345/440 |
| 2015/0042835 A1* | 2/2015 | Chiu | H04N 5/23293 | 348/222.1 |

OTHER PUBLICATIONS

Kirmizibayrak et al., "Interactive Volume Visualization and Editing Methods for Surgical Applications", 2005, Dissertation, The George Washington University, pp. 1-88.*

European Search Report for European Application No. 14191641.1-1502, dated May 11, 2015, with English Translation.

J. Marks et al.,"Design galleries: a general approach to setting parameters for computer graphics and animation," Proceedings of the 24th annual conference on Computer graphics and interactive techniques (SIGGRAPH'97), pp. 389-400, 1997.

König A. H. et al., "Mastering Transfer Function Specification by using VolumePro Technology," Institute of Computer Graphics and Algorithms; 2000 (Mar. 1, 2000), viewed on May 15, 2015 at http://citeseerx.ist.psu.edu/viewdoc/download;jsessionid=EE762000720BC78D8288CEC64324DE75?doi=10.1.1.43.5954&rep=repl&type=Pdf.

Selver M. A., "An object oriented transfer function Editor for Interactive medical vol. visualization," Dokuz eylül university graduate school of natural and applied sciences; pp. 1-83; 2005.

T. He et al., "Generation of transfer functions with stochastic search techniques," Proceedings of the 7th conference on Visualization, pp. 227-234, 1996.

* cited by examiner

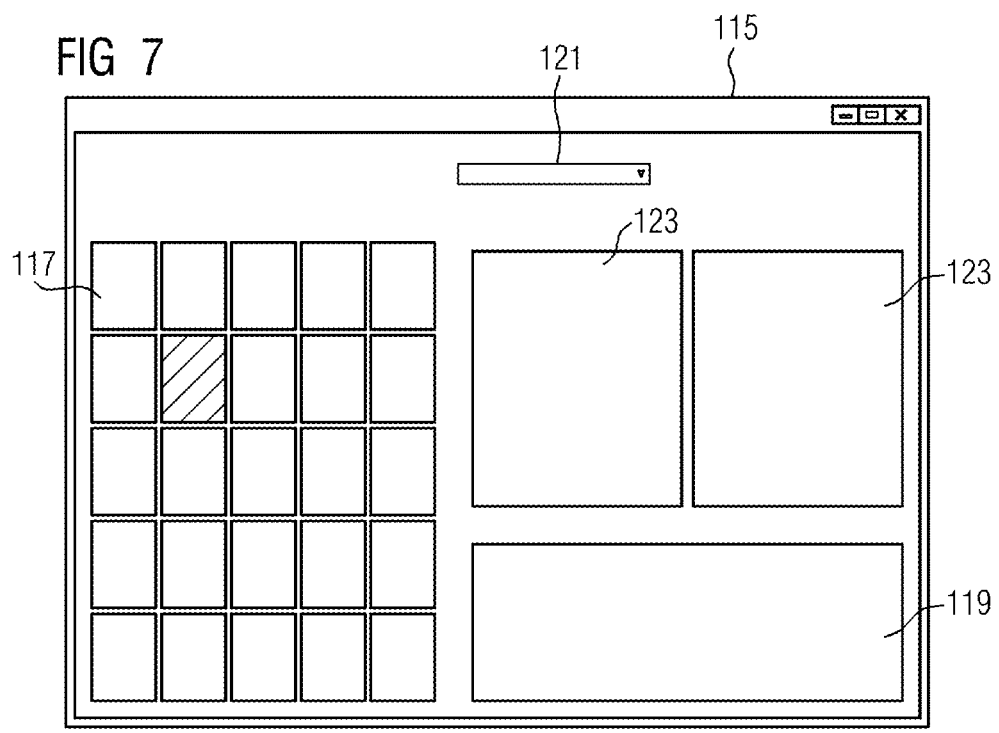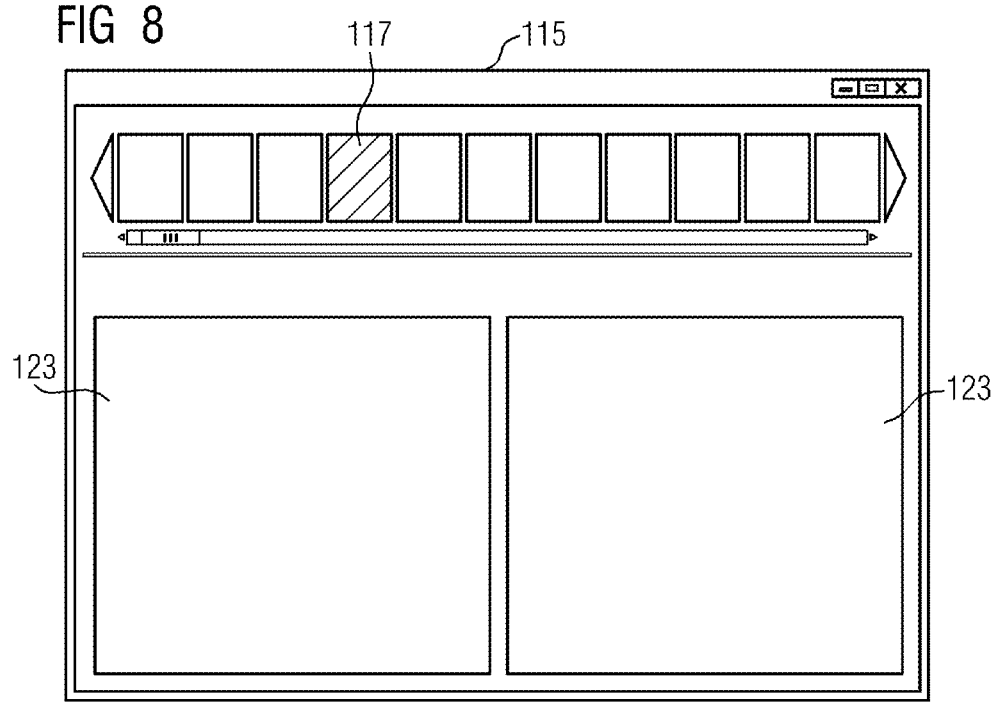

VISUALLY HIGHLIGHTING SPATIAL STRUCTURES

The application claims the benefit of EP14191641.1, filed on Nov. 4, 2014, which is hereby incorporated by reference in its entirety.

BACKGROUND

The present embodiments relate to visually highlighting spatial structures in a volume data record.

Volume data records and corresponding three-dimensional representations play an important role not only in medicine but also in other fields such as, for example, quality assurance or geology. In a scalar volume data record, different gray-scale values correspond to different structures of the originally recorded object (e.g., different types of tissue in a human body).

Direct volume renderings (DVR) represent a colored image of the different structures within a volume by mapping different data values (e.g., gray-scale values) to different colors and opacities. Essentially, such mapping classifies the different objects detected within the data. Direct volume renderings allow fast and efficient examination of the objects.

The mapping of data values to colors and opacities is modeled in a transfer function and is typically represented by a set of piecewise linear functions PWL. A piecewise linear function includes control points, each of which defines a color and opacity in a defined position in the data histogram. Positions between adjacent control points are interpolated linearly. Generally, the quality and usefulness of a direct volume rendering largely depend on the transfer function and the extent to which the transfer function highlights the structures of interest and conceals regions that are not of interest.

The quality of the transfer function is therefore a key factor for direct volume rendering. Defining suitable transfer functions by modifying control points of the piecewise linear function is a time-consuming and complicated task. This is due to the mathematics of light integration, as approximated by direct volume rendering. The mathematics of light integration is decidedly non-linear and makes it difficult to predict the visual impression of a direct volume rendering.

Also, the nature of the transfer function and how the transfer function relates to the final rendering is not intuitive. The transfer function is defined in the data region of the histogram. Therefore, the form of the piecewise linear functions and the position of the control points along the data axis do not indicate where the classified structures are located in the image and how the classified structures overlap with one another. The overlapping of semi-transparent objects result in a mixing of colors in the final image, which is not apparent from the data domains of the transfer function. If software therefore forces a user to change the control points of the piecewise linear function directly, it is very difficult to predict the visual effect of the change. This procedure is time-consuming and difficult for inexperienced users.

Conventionally, the user edits the values of the transfer function directly. If the mapping of colors and opacities is represented using piecewise linear functions, the user edits the positions, colors, and opacities of the control points of the piecewise linear functions.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the highlighting of spatial structures in the volume data record is improved.

A method for visually highlighting spatial structures in a volume data record includes providing a first transfer function for mapping data values of the volume data record to color values of a visual representation, providing a selection option for a user to select a parameter set, and generating a second transfer function based on the first transfer function and the selected parameter set. The method also includes representing the volume data record by the second transfer function. A simultaneous, comparative representation of the volume data record using the first transfer function and the second transfer function may optionally be performed. This has the technical advantage that the transfer function may be changed automatically such that the spatial structures within the data record may be better visualized. The structures may be shown more reliably by a user without precise knowledge of the transfer function. The method may be used, for example, in a medical device.

In one embodiment, the first transfer function or the second transfer function is a piecewise linear function. This has the technical advantage, for example, that the transfer function may be calculated with little outlay.

In a further embodiment, the parameter set may be selected from a number of predefined parameter sets. This has the technical advantage, for example, that the parameter set may be selected easily based on a structure, the representation of which is to be improved. For example, in a medical application, a parameter set may be selected for improving the representation of skin or a parameter set for improving the representation of an internal organ.

In a further embodiment, the parameter set may be selected by marking a region in a graphical representation of the volume data record. This has the technical advantage, for example, that it is possible to easily select the parameter set based on a structure, the representation of which is to be improved.

In a further embodiment, the parameter set may be selected based on a graphical representation of the first transfer function. This has the technical advantage, for example, that the parameter set may easily be selected based on a structure, the representation of which is to be improved.

In a further embodiment, the first transfer function may be selected from a number of predefined transfer functions. This has the technical advantage, for example, that the unselected part of the first transfer function remains constant, and the second transfer function may be calculated quickly and efficiently.

In a further embodiment, the first transfer function may be selected from a sub-region of a piecewise linear function. This has the technical advantage, for example, that the unselected sub-region of the piecewise linear function of the first transfer function remains constant, and the second transfer function may be generated with a small number of calculation steps.

In a further embodiment, a number of second transfer functions are generated based on the first transfer function and the selected parameter set. This has the technical advantage, for example, that a suitable second transfer function may be selected.

In a further embodiment, a preview image is generated for each of the second transfer functions. This has the technical advantage, for example, that the user is able to review the result of each second transfer function visually.

In a further embodiment, the preview image may be selected to bring about a representation of the volume data record with the respective second transfer function. This has the technical advantage, for example, that the structures may be represented accurately within the volume data.

In a further embodiment, the volume data record with the first transfer function is represented at the same time as the volume data record with the second transfer function. This has the technical advantage, for example, that an additional, comparative representation of the volume data record with the first transfer function is brought about.

In a further embodiment, the second transfer function is generated by changing the position of a control point on the horizontal or vertical axis of the first transfer function. This has the technical advantage, for example, that the second transfer function may be generated with little calculation outlay.

In a further embodiment, the second transfer function is generated by changing the color of an individual control point of the first transfer function. This also has the technical advantage, for example, that the second transfer function may be generated with little calculation outlay.

In a further embodiment, the second transfer function is generated by changing the start and end of the first transfer function. This also has the technical advantage, for example, that the second transfer function may be generated with little calculation outlay.

In a further advantageous embodiment, the second transfer function is generated by extending or compressing the first transfer function on the horizontal or vertical axis. This also has the technical advantage, for example, that the second transfer function may be generated with little calculation outlay.

According to a second aspect, a medical device for performing the method according to the first aspect is provided. The medical device is able to generate a volume data record, for example, for a tissue being examined. The medical device may be, for example, a magnetic resonance tomography device, a computed tomography device or an ultrasound device. This allows the same technical advantages to be achieved as with the method according to the first aspect.

BRIEF DESCRIPTION OF THE DRAWINGS

FIG. 7 shows an exemplary layout of a user interface; and

FIG. 8 shows an alternative exemplary layout of a user interface.

DETAILED DESCRIPTION

Figure 1:
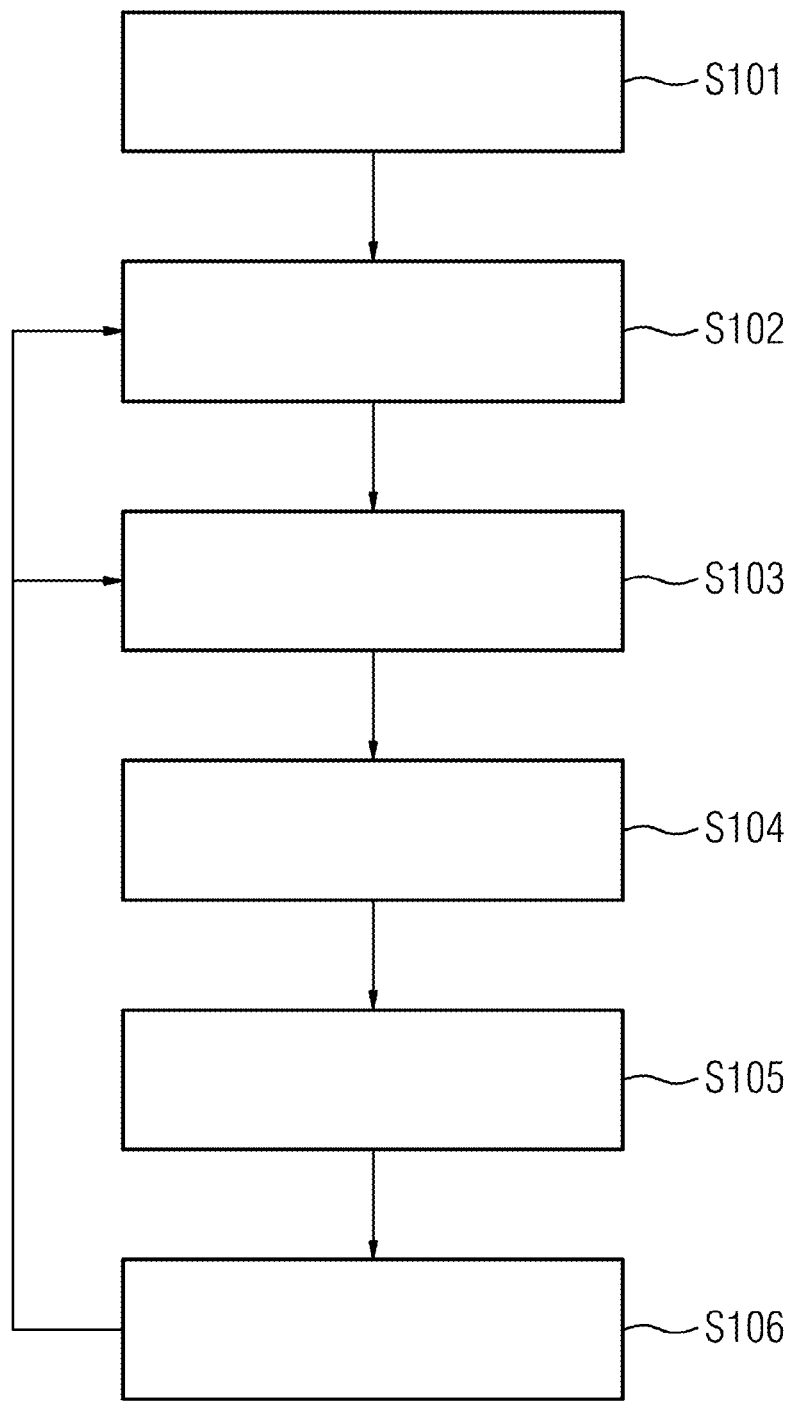
FIG. 1 shows one embodiment of a method for improving visual highlighting of spatial structures.

FIG. 1 shows one embodiment of a method for improving visual highlighting of spatial structures in a volume data record. The method may be used in a medical device that generates a three-dimensional data record in order to highlight defined regions from the volume data more efficiently during a medical examination (e.g., defined internal organs).

In act S101, a first transfer function for mapping data values of the volume data record to color values of a visual representation is first selected and provided.

The first transfer function may be, for example, a function with one or more piecewise linear segments. A user may select the first transfer function (e.g., the transfer function being used in the DVR application). In one embodiment, a user may select just a sub-set of the piecewise linear segments from a larger transfer function. The unselected piecewise linear segments then remain unchanged.

In act S102, the user is given the option of selecting a parameter set representing domain-specific hints for manipulating or changing the first transfer function. The parameter sets are used for an algorithm for generating a second transfer function based on the first transfer function. The parameter sets are used to indicate the algorithm that converges the generated second transfer function more quickly in the direction of the desired end result. This parameter set serves, for example, to weight the regions of the transfer function in order to control the influence of the algorithm. The influence is greater in selected gray-scale regions than in others.

Based on an existing first transfer function, the user generally wishes to change a specific aspect of the visualization (e.g., to highlight defined structures in the data record or conceal others) by assigning a transparency. In the medical field, the user may wish, for example, to highlight defined organs in an abdomen data record during rendering or to conceal skin and muscle tissue. For quality assurance in the industrial field, the user may wish to highlight cracks in a defined material.

The parameter set may be provided in different ways.

A first way involves the user selecting a parameter set from a number of predefined parameter sets, for example, in that the user selects an option from a predetermined set of alternatives (e.g., by checking a selection box in a graphical user interface). This is appropriate for applications in which the volume data and the structures are known. For example, in a specialist medical diagnostic application, the type of structures included in the volume data is known. The application may then provide a number of parameter sets, for example, for organs or tissue types, from which the user may make a selection.

A second way involves the user selecting a parameter data record by marking a region in a graphical representation of the volume data record. This allows the changes to the first transfer function to be focused on a defined region in the data histogram, in that a represented DVR rendering is indicated or colored, and regions to be changed are selected. Each mouse movement may bring about a ray picking action in the data record and calculate the corresponding position in the data region of the histogram. After a number of ray picking actions, the user may define a range of interest in the histogram, which is then preferred for the manipulation of control points by the algorithm. For example, the density distribution of the sample points in the data region of the histogram may define the importance of the control points.

A third way involves the parameter set being selected based on a graphical representation of the first transfer function. The user may, for example, also select a range of interest directly from the visualization of the first transfer function. For example, the user may define start and end data values of the interval as a parameter set. Instead of taking these as strict limits, a slight drop in importance may be used. The user then operates with the transfer function in a more direct way.

In act S103, a second, changed transfer function is generated based on the first transfer function and the selected parameter set. The algorithm generates, for example, a set of second transfer functions, each of which is a changed version of the original first transfer function. Based on the parameter set as a domain-specific hint, the algorithm prefers control points of the piecewise linear function in the range of interest. The transfer function is changed more in the range than outside the range.

In act S104, the user is shown a preview of the rendering. A DVR rendering is generated in the manner of a preview for each of the generated second transfer functions and displayed for the user. When a defined preview is selected, the system may provide before and after comparisons of the DVR renderings of the transfer function.

In act S105, optional manual editing of the piecewise linear functions may take place. For experienced users, the system may provide a control element in the form of a user interface, allowing the user to edit the generated second transfer function directly.

In act S106, the user selects the most suitable rendering from the set of preview images, and the volume data record is represented by the respective second transfer function. If the requirements for the representation are satisfied, the method ends. Otherwise, the generated second transfer function serves as a new basis for a further iteration, starting again with act S102 or S103 for refinement.

In order to generate the new transfer function, the algorithm used changes the control points of the piecewise linear segments of the underlying transfer function taking into account the selected parameter set.

In this process, for example, the location of an individual control point may be changed on the horizontal axis (e.g., a corresponding data value). The location of an individual control point may be changed on the vertical axis (e.g., a corresponding opacity). The color of an individual control point may be changed. The location of a complete piecewise linear curve may be changed. The location of a start and end of a piecewise linear curve may be changed (e.g., just start and/or end points may be moved). A complete linear curve may be compressed or extended horizontally (e.g., the data point interval covered). A complete linear curve may be compressed or extended vertically (e.g., the entire opacity of the curve). The vertical position of line segments of a piecewise linear curve may be changed (e.g., the opacity of a curve segment).

Although colors and opacities are used above as properties of the control points, other possible properties of the control points may also be changed. Nevertheless, color and opacity are important properties of control points in the transfer function. Different algorithms may generally be used to perform a manipulation of the transfer function. A number of user interface elements may guide the user through the process of assessing the generated preview renderings. When a preview rendering is selected, the system may display the new transfer function and the piecewise linear segments in a before/after comparison, showing how the algorithm has changed the transfer function. An enlarged rendering may also be displayed with interactive navigation (e.g., zoom, rotation) of the preview thumbnail. An enlarged synchronized before/after rendering may also be displayed with interactive navigation using the original first transfer function on one side and the generated transfer function of the selected preview image on the other side. This allows the user to compare the visual impressions of the new rendering directly.

The method represents an image-based method for manipulating existing transfer functions. The transfer function may be made up of one or more piecewise linear segments, each piecewise linear segment having control points that define a position in the data histogram and visualization parameters (e.g., color and opacity). However, other types of transfer functions may also be used (e.g., transfer functions with which every data value within the volume is mapped specifically to visualization parameters). Similarly, the method may also be used for transfer functions of greater dimension (e.g., two-dimensional or three-dimensional transfer functions) that use the magnitude of the size of a gradient or the main curvature directions as further arguments in addition to the scalar data values. The method includes the experience of a user, in that the method allows specific parameter sets to be selected or defined graphically with respect to a representation. These parameter sets are used to perform the generation of further transfer functions and to reduce the search space.

Figure 2:
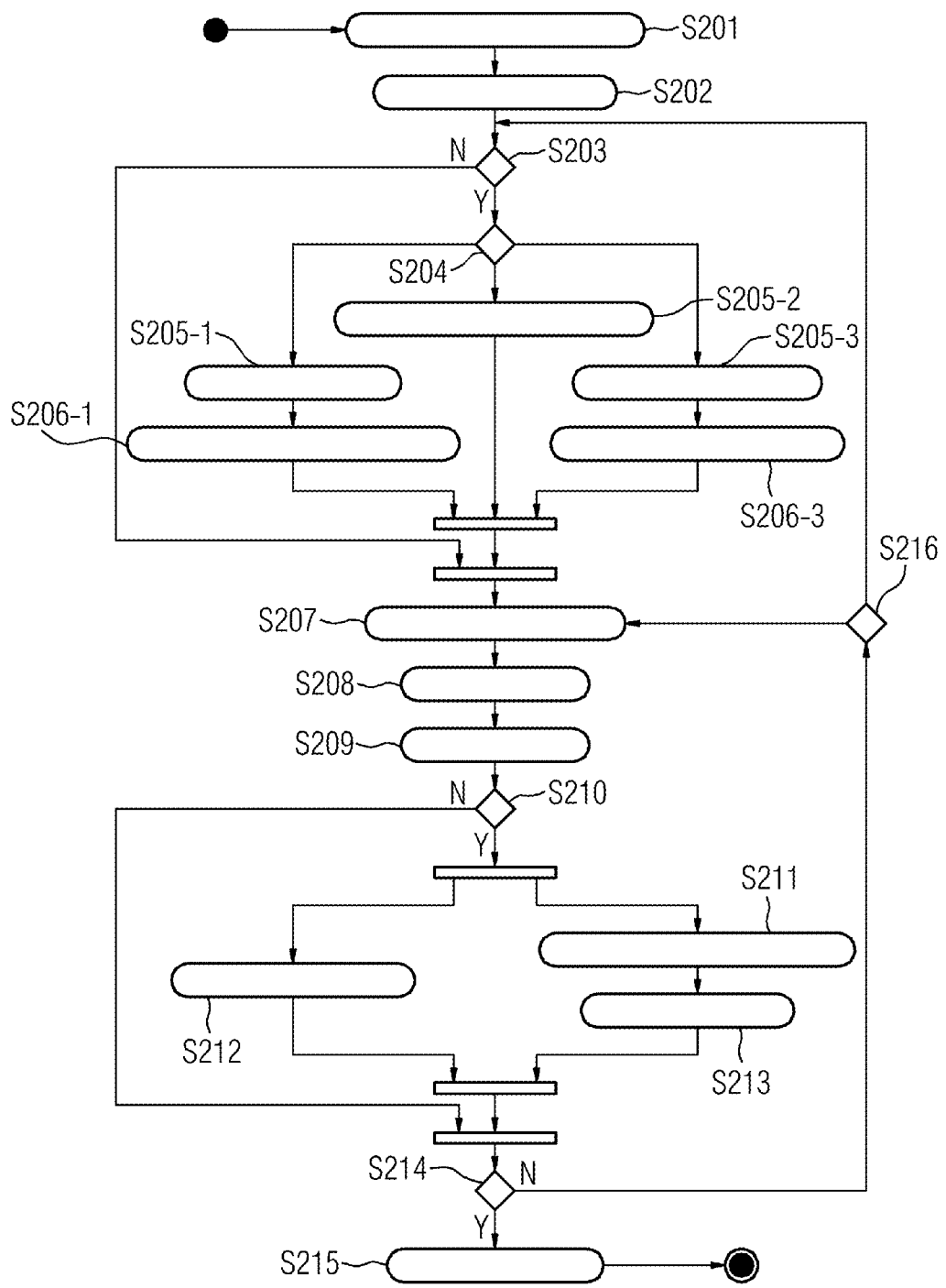
FIG. 2 shows an exemplary activity diagram showing user/system interaction.

FIG. 2 shows an activity diagram, illustrating the user/system interaction. This dynamic view of the system shows how the system and user interact as the transfer function is changed. After a first transfer function has been selected with a set of piecewise linear functions in act S201, a user wishes to change said transfer function. A graphical user interface in the form of a PWL manipulation module opens in act S202. In act S203, it is asked whether a user wishes to make a selection from a number of proposed options for specifying domain-specific parameter sets. Then, in act S204, one of the specific options is requested (e.g., the determining of a range of interest by drawing in the volume, the determining of a range of interest by a user interface of the transfer function or manual selection of a domain-specific parameter set).

In the case of the first option, the method branches to act S205-1, in which the user may draw on the DVR rendering. In act 206-1, selection points are collected to form a parameter set, representing the importance of the data region. In the case of the second option, the method branches to act S205-2, in which the user may define a range of interest as a parameter set in the user interface controller of the transfer function. In the case of the third option, the method branches to act S205-3, in which the user may specify a domain-specific parameter set. In act S206-3, the range of interest is selected based on the parameter set.

In act S207, a set of changed transfer functions is generated based on the original transfer function and the determined parameter set. In act S208, DVR preview images are generated. In this process, the algorithm changes the parameters of the piecewise linear segments, renders DVR preview thumbnails, and displays the DVR preview thumbnails for the user.

In act S209, the user selects a preview image. In act S210, it is asked whether a closer examination is required. In act S211, an interactive before/after DVR rendering is displayed. In act S212, before/after transfer functions are displayed. In act S213, the user navigates in the renderings. When a DVR preview thumbnail is selected, the user is therefore able to compare the visual impression of the selected preview with the original using either the interactive before/after DVR rendering or a before/after display of the transfer functions.

In act S214, it is determined whether the new transfer function is appropriate. If the new transfer function is appropriate, the method branches to act S215, in which the manipulation module for the transfer function is closed. The user is satisfied with the solution, and the generated transfer function of the selected preview is stored.

If this is not the case, the method branches to act S216, in which it is determined whether the domain-specific parameter set is to be retained or refined. The user may continue with the optimization and embarks on a subsequent iteration of the method. If the parameter set is to be retained, the method branches again to act S207. If the parameter set is to be refined, the method branches to act S203, and the respective acts are repeated.

Figure 3:
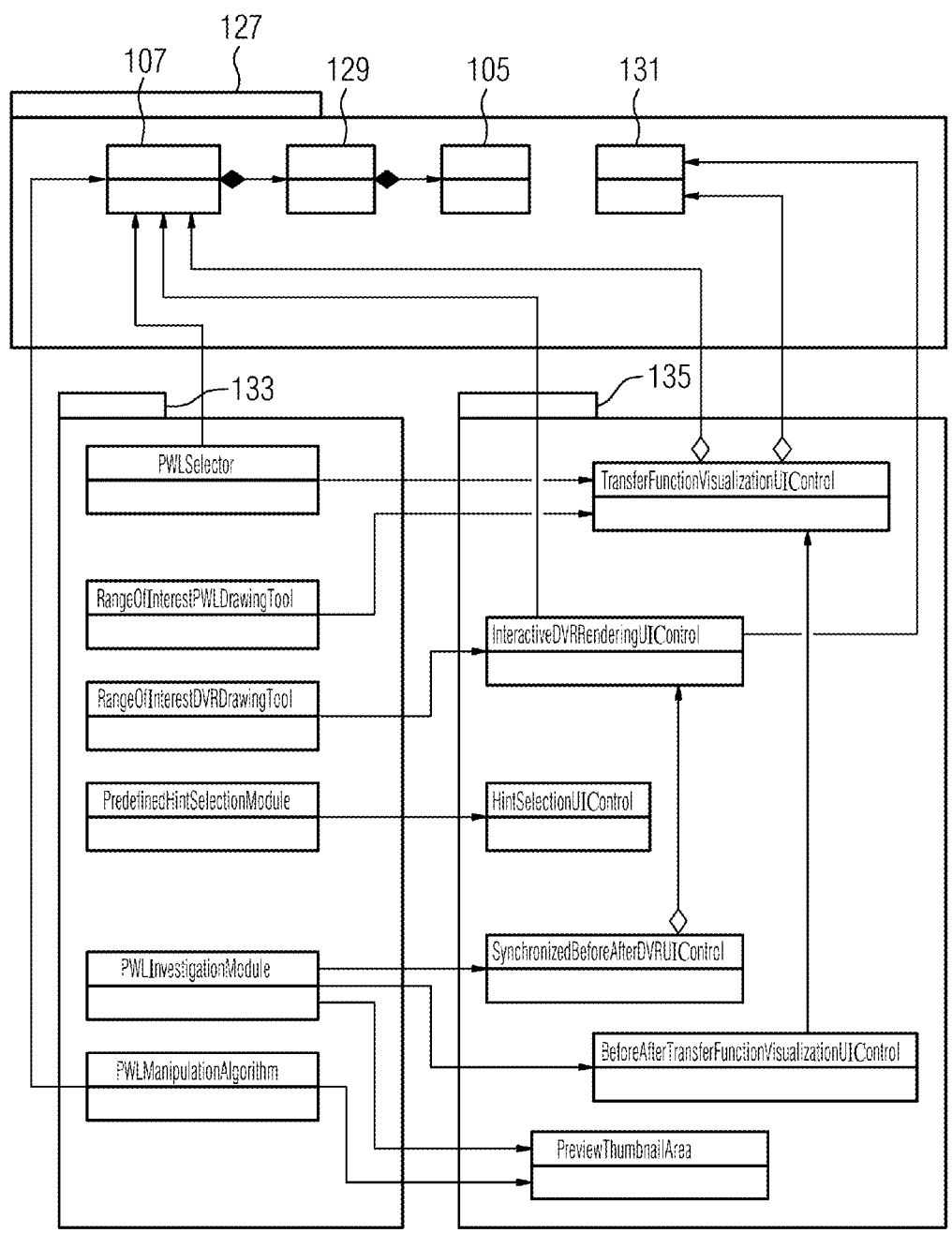
FIG. 3 shows an exemplary diagram of possible components and corresponding relationships.

FIG. 3 shows a diagram of possible components and corresponding relationships. The data packet 127 contains the database (e.g., the transfer function 107, made up of one or more piecewise linear segments 129, the control points 105, and the three-dimensional volume data 131).

A number of aspects are modeled by components in the packet including the PWL manipulation module 133 and the user interface elements 135. The components are also reflected in the actions in the dynamic activity diagram in FIG. 2.

The component PWLSelector allows a user to select a transfer function 107 or individual piecewise linear segments 129 therefrom, which are to be manipulated and changed. The component PWLSelector uses the component TransferFunctionvisualizationUIControl. The following three components in the PWL manipulation module 133—RangeOfInterestPWLDrawingTool, RangeOfInterestDVRDrawingTool and PredefinedHintSelectionTool—deal with the definition of the domain-specific parameter sets. These use different user interface controllers for this task (e.g., the display unit of a combo box, brush-type drawing in a DVR rendering window, or the specification of an interval in the user interface controller of a transfer function).

Intelligent algorithms map the parameter data records to regions in the histogram. The component PWLManipulationAlgorithm represents the core of the system, as the component PWLManipulationAlgorithm generates the changes to the selected transfer function and prompts the rendering of the preview thumbnails. Complexity is abstracted in the diagram, as algorithms for manipulating the transfer function are used.

The component PWLInvestigationModule allows the user to examine selected preview images in greater detail (e.g., by displaying the preview and the original DVR rendering side by side or by showing the differences in the transfer function).

Figure 4:
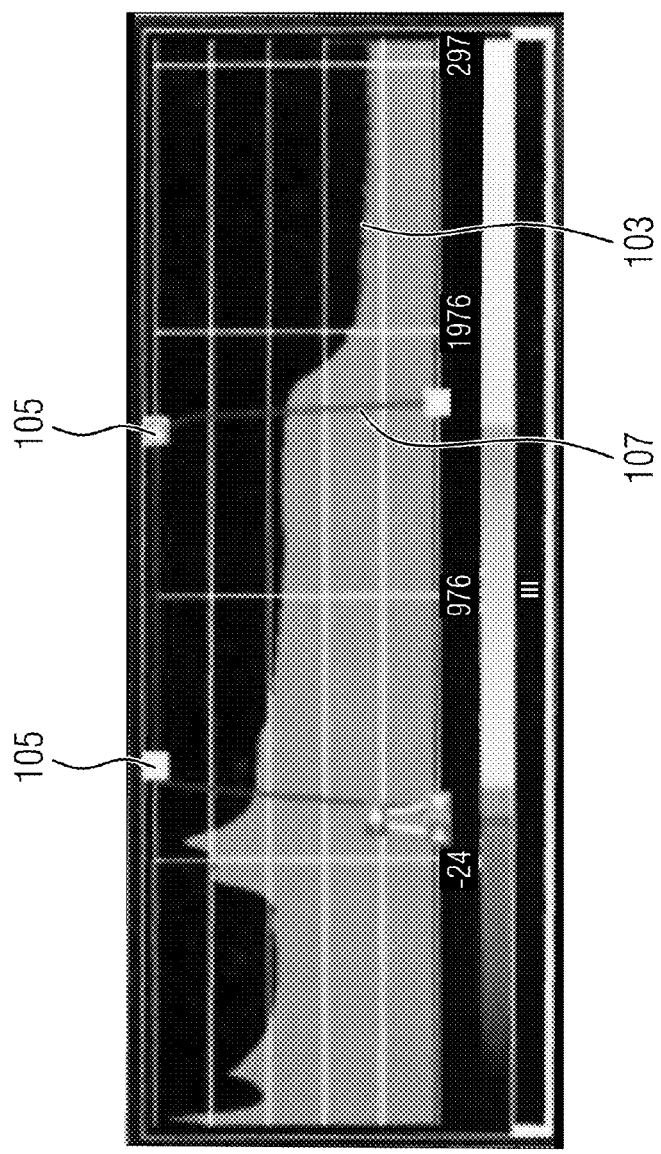
FIG. 4 shows an exemplary representation of a DVR rendering.
Figure 4:
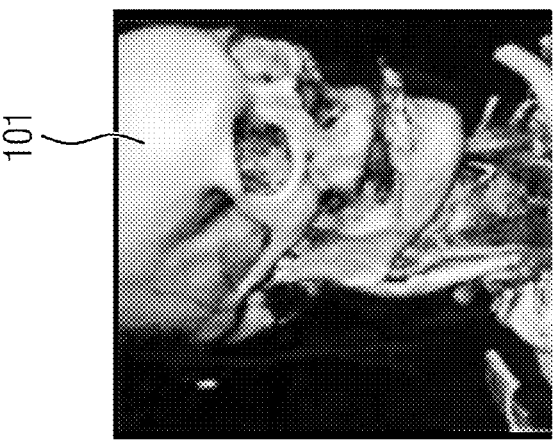

FIG. 4 shows a representation 101 of a DVR rendering of a volume data record with associated transfer function 107. The transfer function 107 includes two piecewise linear segments (PWLs) marked on a scalar data histogram 103 of the data. The height of the control points 105 indicates corresponding opacity. The linearly interpolated colors are plotted along the X axis in the lower region.

Figure 5:
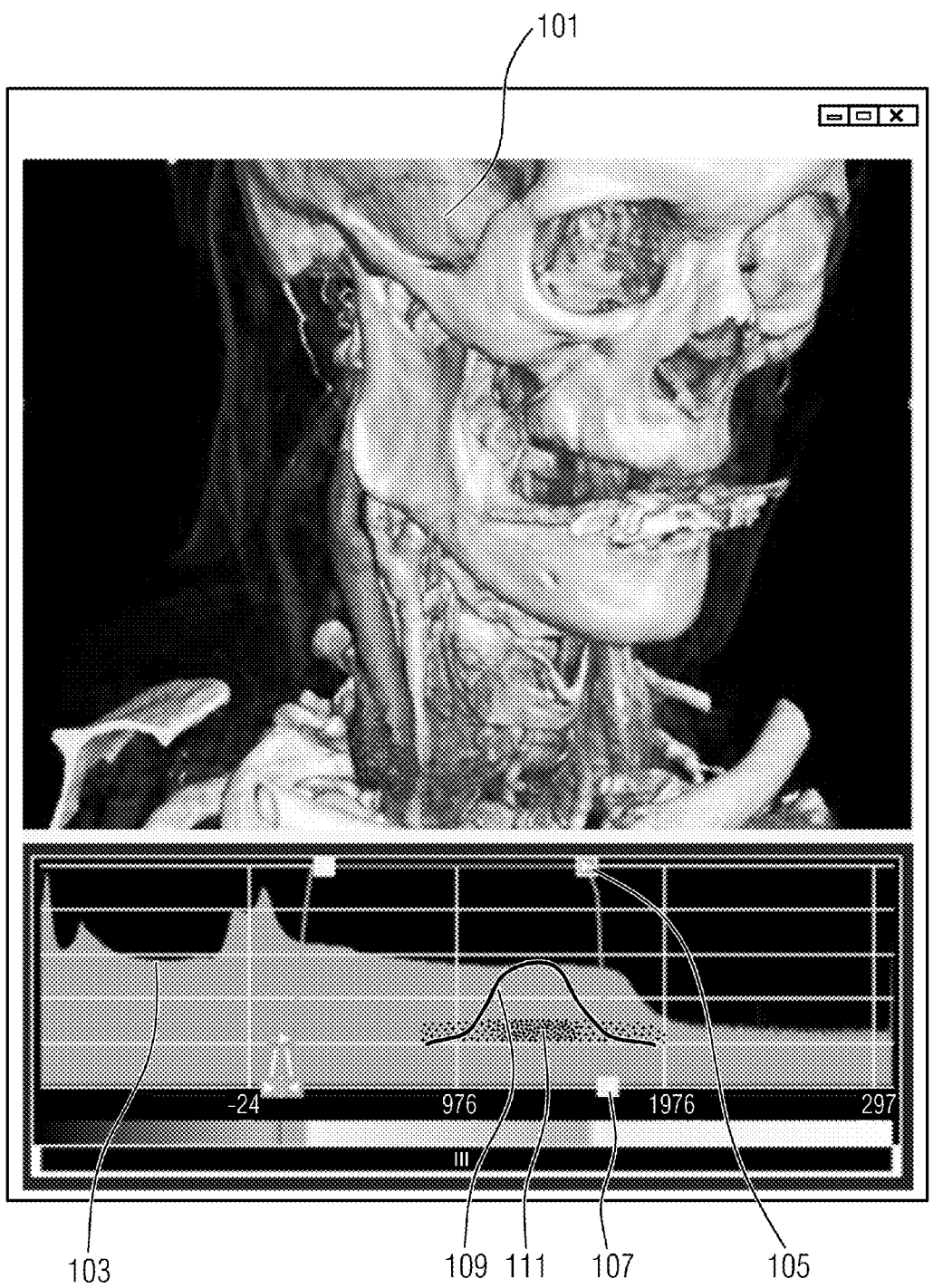
FIG. 5 shows an exemplary representation of a range of interest within the DVR rendering.

FIG. 5 shows a representation 101 of a range of interest within the DVR rendering and a displayed density distribution 109 of selected points 111 in the data histogram 103. A user may select the range of interest within a DVR rendering window by generating a number of points 111 from the range (e.g., with a mouse click in the DVR rendering window). This corresponds to the component RangeOfInterestDVRDrawingTool. The density distribution 109 is calculated based on the points 111. The individual selected points 111 are shown in the data histogram 103. The user interface controller of the transfer function 107, shown below the representation 101, shows a possible visualization of the resulting range of interest and the weighting curve, which is calculated from the density distribution 109 of the selected points 111. The precise arrangement of the points and the weighting curve along the vertical axis is generally arbitrary.

Figure 6:
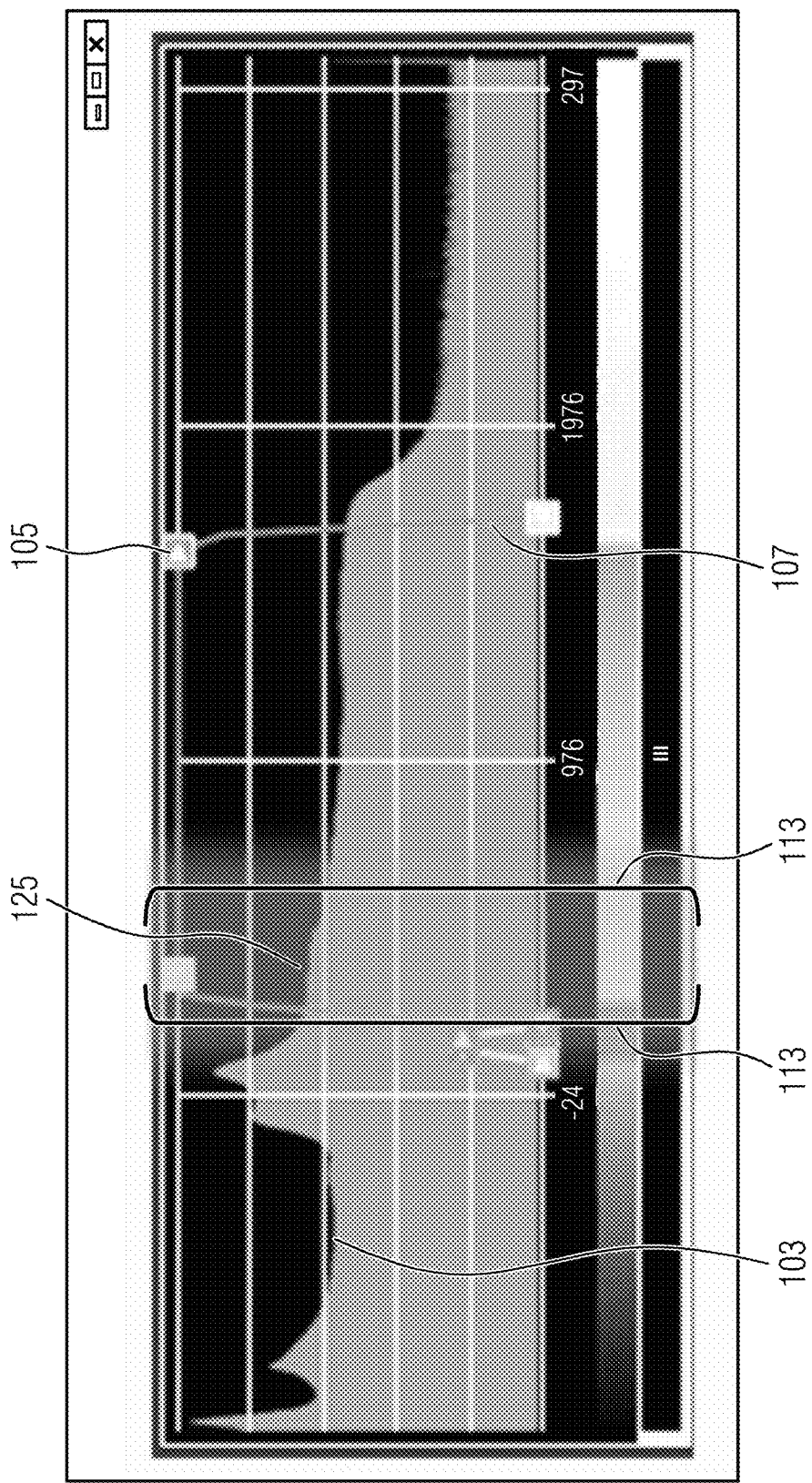
FIG. 6 shows an exemplary definition of a range of interest within the user interface controller.

FIG. 6 shows an exemplary definition of a range of interest 125 within the user interface controller of the transfer function 107. One possible implementation of a user interface controller allows the user to specify a range of interest 125 within the user interface controller of the transfer function 107. This corresponds to the component RangeOfInterestDVRDrawingTool. The user sets the position of the start and end of an interval, which is bounded by brackets 113 and specifies the range of interest 125. The effect of the algorithm is at its most marked within this interval. The effect of the algorithm reduces increasingly to the left and right of the interval.

FIG. 7 shows an exemplary layout of a user interface 115 with predefined domain-specific selection of the parameter set. The layout for the user interface 115 serves to represent and display the generated DVR preview thumbnails 117 and the user interface of the before/after DVR comparison 119 for a user.

The upper selector 121 allows the user to specify domain-specific parameter sets using a combo box controller. This region corresponds to the components PredefinedHintSelectionTool and HintSelectionUIControl. The left region displays a set of DVR preview thumbnails 117 and corresponds to the component PreviewThumbnailArea. The thumbnails 117 are rendered using the transfer functions generated by the algorithm. When the user selects a DVR preview thumbnail 117, the before/after DVR comparison 119 and the transfer function comparison user interface controller 123 on the right side are filled in. These aspects are represented by the components PWLInvestigationModule and SynchronizedBeforeAfterDVRUIControl and BaforeAfterTransferFunctionVisualizationUIControl.

FIG. 8 shows an alternative exemplary layout of a user interface 115 with movable DVR preview thumbnails 117 and an enlarged before/after DVR comparison 119. The comparison of the visual impressions of the original and selected DVR renderings is highlighted here.

The arrangement of the DVR preview thumbnails 117 may be varied. The user may move the DVR preview thumbnails 117 horizontally. In this layout of the user interface 115, the specification of domain-specific parameter sets is concealed and displayed using a separate user interface. However, other possible layouts may generally also be used.

The scope of protection of the present invention is defined by the claims and is not restricted by the features described in the description or illustrated in the figures.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for visually highlighting spatial structures in a volume data record, the method comprising:
providing a first transfer function for mapping data values of the volume data record to color values of a visual representation of the spatial structures;
providing a selection option for a user to select a parameter set, wherein the selected parameter set is a domain specific parameter set, and wherein the parameter set is selectable by marking a region in a graphical representation of the volume data record;
generating a number of second transfer functions based on the first transfer function and the selected parameter set;
generating a preview image for each of the number of second transfer functions, and
representing the spatial structures with the volume data record using at least one of the number of second transfer functions, wherein each preview image for each of the number of second transfer functions is selectable to bring about a representation of the volume data record with a respective second transfer function,
wherein the volume data record with the first transfer function is represented at a same time as a representation of the volume data record with a second transfer function associated with a selected preview image.

2. The method of claim 1, wherein the first transfer function or at least one of the number of second transfer functions is a piecewise linear function.

3. The method of claim 1, wherein the parameter set is selectable from a number of predefined parameter sets.

4. The method of claim 1, wherein the parameter set is selectable based on a graphical representation of the first transfer function.

5. The method of claim 1, wherein the first transfer function is selectable from a number of predefined transfer functions.

6. The method of claim 1, wherein the first transfer function is selectable from a sub-region of a piecewise linear function.

7. The method of claim 1, wherein at least one of the number of second transfer functions is generated by changing a position of a control point on a horizontal or vertical axis of the first transfer function.

8. The method of claim 1, wherein at least one of the number of second transfer functions is generated by changing a color of an individual control point of the first transfer function, or at least one of the number of second transfer functions is generated by changing the start, end, or start and end of the first transfer function.

9. The method of claim 1, wherein at least one of the number of second transfer functions is generated by extending or compressing the first transfer function on a horizontal or vertical axis.

10. The method of claim 3, wherein the parameter set is selectable based on a graphical representation of the first transfer function.

11. The method of claim 10, wherein the first transfer function is selectable from a number of predefined transfer functions.

12. A medical device comprising:
a medical scanner configured to generate a volume data record representing tissues;
a controller configured to provide a first transfer function for mapping data values of a volume data record to color values of a visual representation of tissues, to generate a number of second transfer functions based on the first transfer function and a user selected parameter set, and to generate a preview image for each of the number of second transfer functions, wherein each preview image for each of the number of second transfer functions is selectable to bring about a representation of the volume data record with a respective second transfer function, wherein the selected parameter set is a domain specific parameter set, and wherein the parameter set is selectable by marking a region in a graphical representation of the volume data record; and
a display in communication with the controller, the display configured to provide a selection option for a user to select the parameter set, to display the preview image for each of the number of second transfer functions, and to represent the tissues with the volume data record using at least one of the number of second transfer functions, wherein the volume data record with the first transfer function is represented in the display at a same time as a representation of the volume data record with a second transfer function associated with a selected preview image.

* * * * *